UNITED STATES PATENT OFFICE.

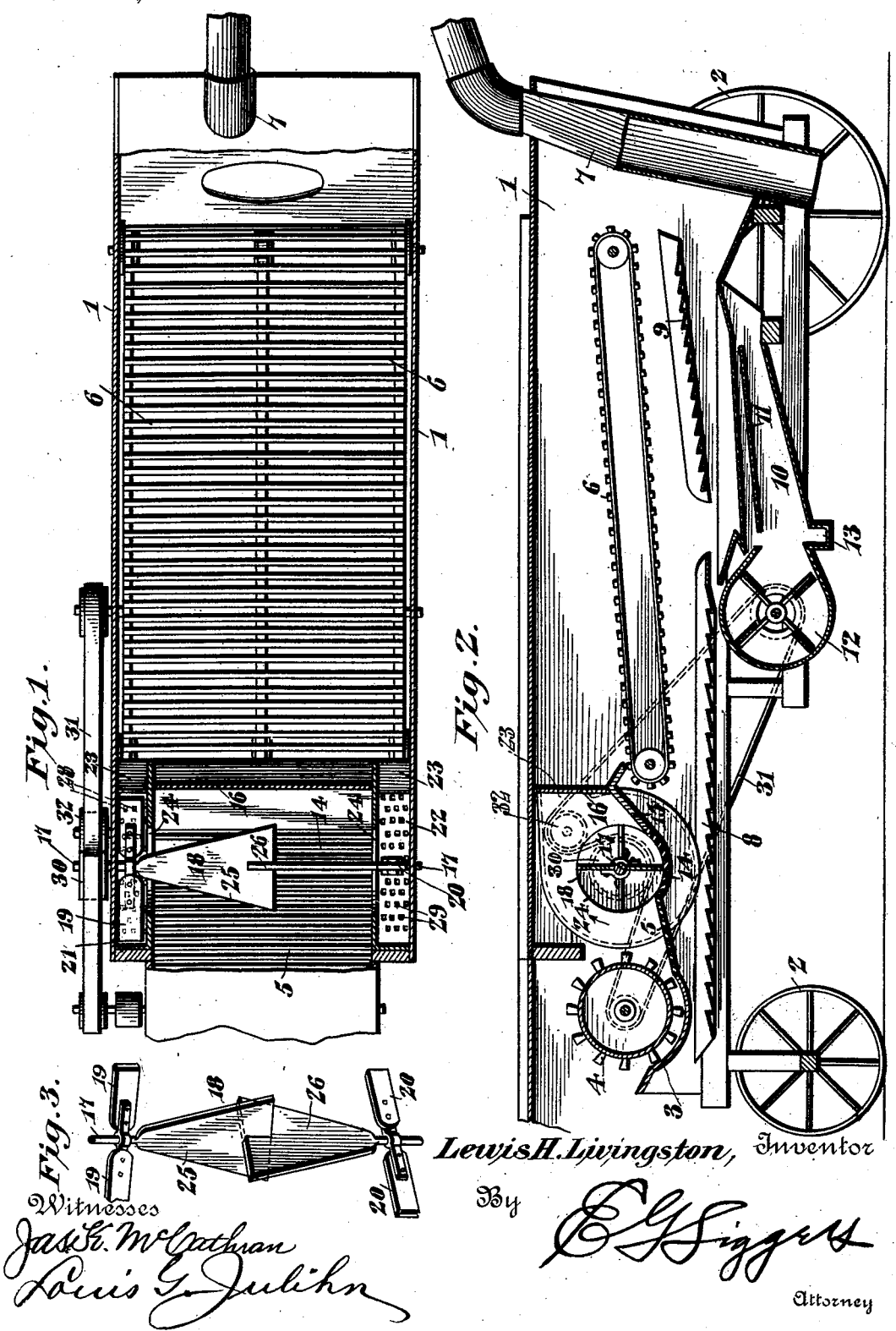

LEWIS H. LIVINGSTON, OF HENNESSEY, OKLAHOMA TERRITORY, ASSIGNOR OF ONE-HALF TO IRA A. BUTCHER, OF HENNESSEY, OKLAHOMA TERRITORY.

THRESHING-MACHINE.

SPECIFICATION forming part of Letters Patent No. 713,229, dated November 11, 1902.

Application filed February 27, 1902. Serial No. 95,892. (No model.)

*To all whom it may concern:*

Be it known that I, LEWIS H. LIVINGSTON, a citizen of the United States, residing at Hennessey, in the county of Kingfisher and Territory of Oklahoma, have invented a new and useful Threshing-Machine, of which the following is a specification.

My invention relates to threshing-machines of that type which embody a cylinder and concave for effecting the separation of the grain from the straw, suitable grain-pans for delivering the grain to the cleaning-shoe, a straw-carrier for delivering the straw to the rear end of the machine, and a pneumatic stacker for conveying the straw from the machine and delivering it at a remote point.

In certain sections of the country, particularly in Oklahoma Territory, a considerable portion of the grain does not fully mature, and it has been found in practice that the ordinary separating or threshing mechanism is ineffective for the complete separation of such grain from the chaff and straw. It has also been noted that a considerable proportion of the grain passing to the pneumatic stacker with the straw has been separated by the combined mechanical and pneumatic action of the stacker mechanism, but has nevertheless been lost and deposited with the straw upon the stack.

The object of my invention, therefore, is to utilize a mechanism similar in action to the straw-stacker as a part of the threshing or separating apparatus of the machine, so that such grain as has heretofore been separated from the straw by the action of the stacker too late to be saved will be separated by the machine prior to the delivery of the straw to the stacker, and thereby saved.

To the accomplishment of this object the invention consists in interposing between the threshing-cylinder and the straw-carrier of the machine an additional separating mechanism having combined mechanical and pneumatic action and consisting of a rotary beater of peculiar form arranged over a foraminous concave or concaved grate. This beater revolves in a direction opposite to the direction of movement of the straw and serves to thresh the straw against the rough surface of the concave, permitting the grain to fall through the latter and to feed the straw in opposite directions to a pair of fan-casings located at opposite ends of the beater and containing inclosed fans which create suction tending to draw the straw into the casing and which also after subjecting the straw to an additional threshing action discharge it rearwardly upon the straw-carrier for conveyance to the stacker at the rear end of the machine.

A further object of the invention is to cause not only the complete separation of the grain from the straw prior to the delivery of the straw to the stacker, but to insure the delivery of the grain to the grain-pan direct from the separating mechanism, so that the straw and grain will not be delivered together from the separating mechanism to the straw-carrier, in which event a considerable portion of the grain would be retained by the straw and lost.

A still further object of the invention is to provide means for preventing the clogging of the beater by providing a stop-wall at a point removed from the beater and a return-board extending from the concaved grate to said stop-wall in order that the straw thrown against the stop-wall by the beater will travel back along the return-board to the concaved grate without tending to impede the beater, and thereby reduce the efficiency of the threshing mechanism.

To the accomplishment of these objects and others subordinate thereto the invention comprehends in its preferred embodiment that construction and arrangement of parts hereinafter described, illustrated in the accompanying drawings, and finally claimed.

In said drawings, Figure 1 is a sectional plan view of my threshing-machine complete. Fig. 2 is a longitudinal section thereof, and Fig. 3 is a detail view of the beater and fans.

Like numerals are employed to designate corresponding parts throughout the several views.

The threshing-machine illustrated in its general aspect is ordinary and comprises the usual casing 1, mounted on wheels 2 and inclosing the concave 3 and threshing-cylinder 4. From the rear edge of the concave 3 extends the rearwardly-inclined grate 5, and at a point in rear of the grate and separated therefrom by a considerable interval is the usual endless straw-carrier 6, designed to deliver the straw in a manner to be described from the separating mechanism to the straw-stacker 7.

Below the separating mechanism and straw-carrier are disposed suitable grain-pans 8 and 9, arranged to deliver the grain to a cleaning-shoe 10, which includes the usual screen 11 and a blower 12, the latter serving to project a blast of air through the cleaning-shoe for the purpose of cleaning the grain prior to its delivery to the spout 13, located at the lower end of the shoe 10. The construction thus far described is ordinary and is disclosed merely for the purpose of showing the manner in which my invention is related to and associated with the various parts of a common type of threshing-machine.

Beyond the upper rear end of the grate 5, leading from the concave 3, is disposed in accordance with my invention a foraminous concave or concaved grate 14, extending transversely of the casing and located between the grate 5 and an upwardly-inclined return-board 15, at the rear edge of which is disposed a vertical stop-wall 16, which prevents in a manner to be described the passage of the straw to the straw-carrier until it has been subjected to the action of the several separating devices. Above the concaved grate 14 is disposed a transverse beater-shaft 17, upon which is mounted a rotary beater 18 and fans 19 and 20. The beater is designed to revolve in coöperative proximity to the concaved grate, and the fans 19 and 20, which are mounted upon the shaft 17 beyond the opposite ends of the beater, revolve in fan-casings 21 and 22, having rearwardly-disposed spouts 23 and provided with enlarged openings 24 in their opposed side walls. The openings 24 are concentric with the shaft 17 and are of such dimensions as will bring their lower edges coincident with the lower ends of the concaved grate.

The beater 18 is composed of a pair of oppositely-tapering blades 25 and 26, the inner ends of which extend past each other and are of sufficient width to cause the middle of the beater to revolve almost in contact with the face of the concaved grate. These beater-blades are also disposed at right angles to each other, as shown, and, rotating in the direction of the arrow in Fig. 2, are designed to strike against the straw delivered from the concave and to throw said straw over the beater and back against the stop-wall 16. The straw upon being brought into violent contact with the stop-wall drops upon the return-board 15 and is returned to the concaved grate 14, against which it is violently rubbed or threshed, the liberated grain falling through the grate upon the grain-pan 8. At this point two facts should be noted: first, that the stop-wall 16 is located at the rear edge of the fan-casings, and thus leaves a considerable interval between the wall and the beater, which prevents the straw from being clogged between the beater and said wall, and, second; that the pocket or concaved grate with which the beater coöperates is not a solid imperforate wall, but is open, so that the grain detached from the straw by the operation of the beater is permitted to gravitate at once to the grain-pan instead of being carried back with the straw to the straw-carrier. It should, furthermore, be noted that by making the concave 14 of open-work form its upper surface is broken, which greatly increases the threshing action of the beater, and, furthermore, enables strong currents of air, induced by the rotation of the beater, to pass through the concave or concaved grate and to materially assist in the separation of the grain from the chaff.

By reason of the peculiar form of the beater the body of straw will be divided at the middle of the machine and fed in opposite directions to the fan-casings 19 and 20, this lateral movement of the straw being aided materially by the suction resulting from the rotation of the fans. These fans are, like the blades of the beater, set at right angles to each other, and each is composed of a pair of blades 27 and 28, extending radially from the shaft 17. The straw fed into the fan-casings by the combined mechanical and pneumatic action will be whirled violently within the fan-casings and subjected to further threshing action. Any grain which has been separated from the straw within the fan-casings will now gravitate through the foraminous bottom walls 29 of the latter and will be deposited upon the grain-pan 8, while the straw will be finally blown back through the spouts 23 and delivered to the straw-carrier 6, whence it will be carried in the usual manner to the pneumatic conveyer or stacker 7.

Power may be applied to the shaft 17 in any suitable manner, but preferably by providing said shaft with a pulley 30, around one side of which leads the usual belt 31, employed for belting the blower 12 to the concave-cylinder, an idler being located at a convenient point to properly train the belt.

It will be noted from the foregoing that I have provided a novel form of supplemental separating or threshing mechanism designed to be interposed between the primary threshing mechanism and the straw-carrier of the threshing-machine, and, furthermore, that said mechanism is so constructed and arranged as to secure the combined results of mechanical and pneumatic separative action and to effect the delivery of the separated grain directly to the grain-pan from the separating mechanism prior to the delivery of the straw to the straw-carrier. It should be distinctly understood, however, that while the present embodiment of the invention is thought at this time to be preferable I do not wish to limit myself to the structural details defined, as it is obvious that many changes, modifications, and variations of the illustrated structure may be effected without departing from the spirit or sacrificing any of the advantages of said invention.

What I claim is—

1. In a threshing-machine, the combination with a cylinder and concave, of a concaved grate disposed transversely of the machine and located beyond the cylinder to receive the threshed material, a rotary beater disposed above and in close coöperative proximity to the concaved grate, fan-casings located beyond the opposite ends of the concaved grate and provided with spouts, and rotary fans within the fan-casings, whereby the straw and grain fed to the concaved grate from the threshing-cylinder will be subjected to a combined mechanical and pneumatic separative action causing the separated grain to drop through the concaved grate, and effecting the delivery of the straw alone through the spouts of said casings.

2. In a threshing-machine, the combination with a cylinder and concave, of an inclined grate extending rearwardly from the concave, a concaved grate located beyond the rear end of the inclined grate and disposed transversely of the machine, an inclined return-board extending from the rear edge of the concaved grate, and a stop-wall located at the rear edge of the return-board, of a pair of fan-casings located one at each end of the concaved grate, said fan-casings having rearwardly-disposed spouts, and side openings at the ends of the concaved grate, a rotary beater disposed above and in close coöperative proximity with the concaved grate, and rotary fans within the fan-casings.

3. In a threshing-machine, the combination with a transversely-disposed concaved grate, and fan-casings located one at each end thereof and provided with spouts, of a stop-wall located in rear of and in spaced relation to the concaved grate, an inclined return-board extending from the stop-wall to the concaved grate, rotary fans within the fan-casings, and a rotary beater located above and in close proximity to the concaved grate.

4. In a threshing-machine, the combination with a cylinder, and concave, of a concaved grate disposed transversely of the machine and located beyond the cylinder, a rotary beater disposed above and in close coöperative proximity to the concaved grate, fan-casings located beyond the opposite ends of the concaved grate and provided with foraminous bottom walls and with rearwardly-disposed spouts, and rotary fans within the fan-casings, whereby the straw and grain fed to the concaved grate from the threshing-cylinder will be subjected to a combined mechanical and pneumatic separative action causing the separated grain to drop through the concaved grate, and through the bottom walls of the fan-casing, and effecting the delivery of the straw alone through the spouts of said casings.

5. In a threshing-machine, the combination with a cylinder and concave, of an inclined grate extending rearwardly from the concave, a transversely-disposed concaved grate located beyond the rear end of the inclined grate, an inclined return-board extending from the rear edge of the concaved grate, and a stop-wall located at the rear edge of the return-board, of a pair of fan-casings located one at each end of the concaved grate, said fan-casings having rearwardly-disposed spouts, foraminous bottom walls, and side openings having their lower edges coincident with the ends of the concaved grate, a rotary beater disposed above and in close coöperative proximity with the concaved grate, and rotary fans within the fan-casings.

6. In a threshing-machine, the combination with a transversely-disposed concaved grate, and fan-casings located at the opposite ends thereof and provided with spouts and foraminous bottom walls, of a stop-wall located in rear of and in spaced relation to the concaved grate, an inclined return-board extending from the bottom of the stop-wall to the rear edge of the concaved grate, rotary fans within the fan-casings, and a rotary beater located above and in close proximity to the concaved grate.

In testimony that I claim the foregoing as my own I have hereto affixed my signature in the presence of two witnesses.

LEWIS H. LIVINGSTON.

Witnesses:
G. W. BEAR,
I. M. DIXON.